A. C. TAYLOR.
METHOD OF ELECTRIC WELDING AND ARTICLES PRODUCED THEREBY.
APPLICATION FILED MAR. 12, 1917.
1,243,004.
Patented Oct. 16, 1917.
2 SHEETS—SHEET 1.
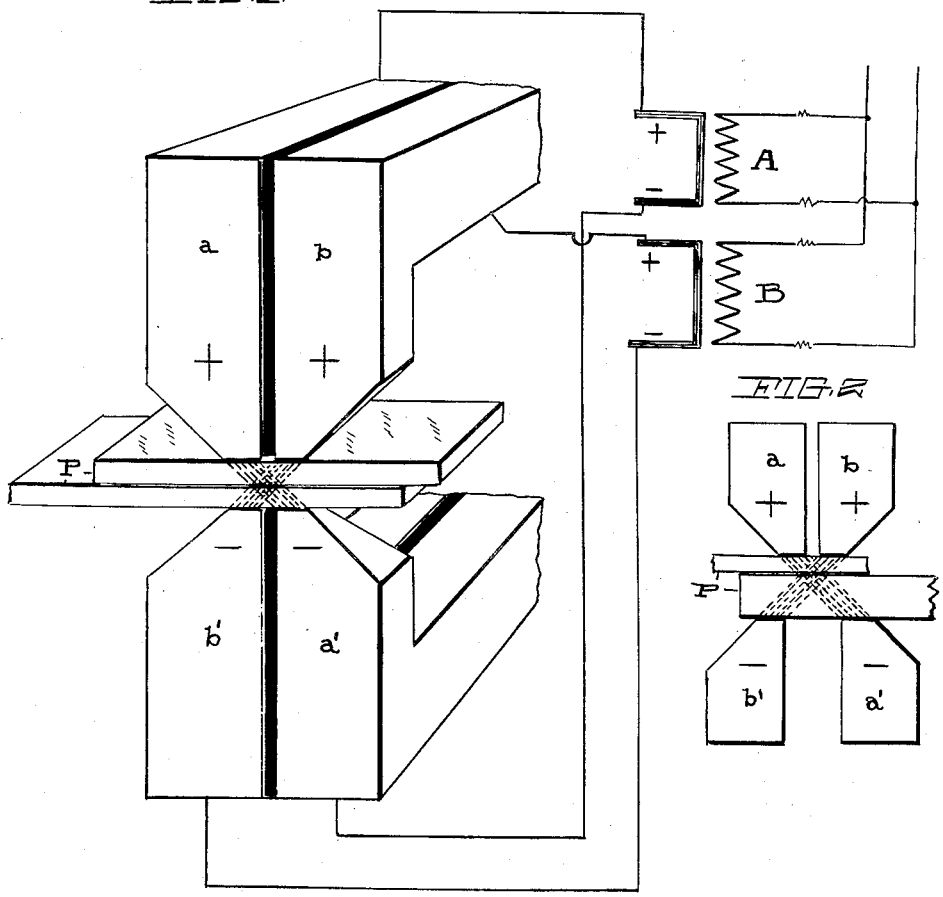
Inventor
ALBERTIS C. TAYLOR
By Fisher & Moser
Attorneys

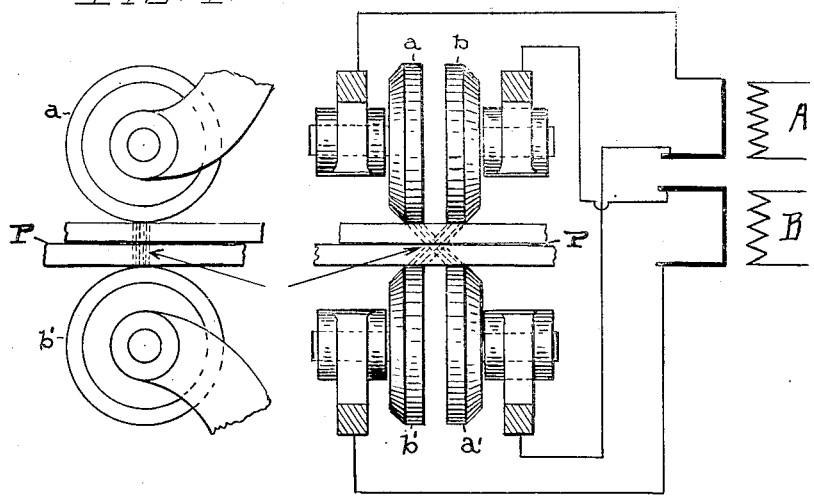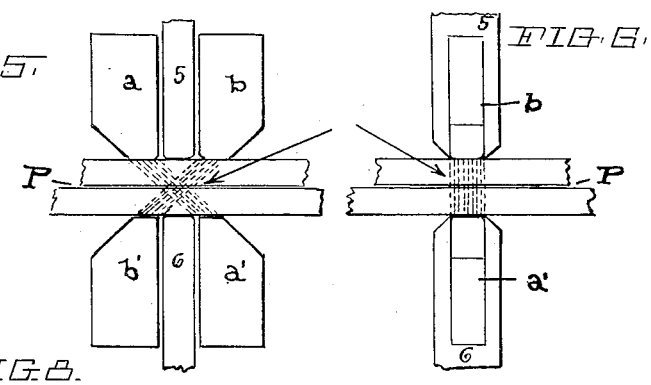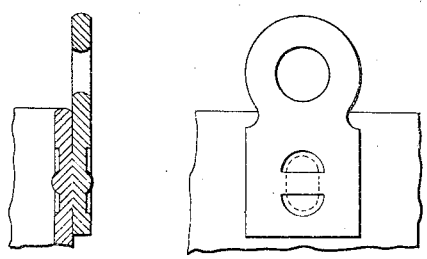

UNITED STATES PATENT OFFICE.

ALBERTIS C. TAYLOR, OF WARREN, OHIO.

METHOD OF ELECTRIC WELDING AND ARTICLES PRODUCED THEREBY.

1,243,004.   Specification of Letters Patent.   Patented Oct. 16, 1917.

Application filed March 12, 1917. Serial No. 154,075.

*To all whom it may concern:*

Be it known that I, ALBERTIS C. TAYLOR, citizen of the United States, residing at Warren, in the county of Trumbull and State of Ohio, have invented certain new and useful Improvements in Improved Methods of Electric Welding and Articles Produced Thereby, of which the following is a specification.

My invention relates to an improved method of electric welding, the object being to unite two or more pieces of metal homogeneously together by the application of pressure and the crossing of two separate electric currents in a restricted area in the opposed meeting surfaces of the said pieces.

I am familiar with the methods of electric welding disclosed in the patents to E. Thomson, No. 444,928, H. F. A. Kleinschmidt, No. 616,436, and Johann Harmatta, No. 1,046,066, each involving the use of a single set of electrodes, whereby pressure is applied and an electric current is passed through the work on a line at right angles to the plane of the surfaces being welded, the pressure being applied by direct contact of the electrodes at the place or spot where the heat is greatest. In the actual practice of such methods the copper conductors and electrodes are made of liberal size to minimize the resistance to the electric current and are also tapered or reduced at their contact portions to localize the heating current and pressure, and the large volume of current necessary to heat the work to a welding temperature heats the reduced ends of the electrodes, and these being directly in contact with the welding area radiate a considerable amount of the heat from the work. The result is that the electrode ends become soft, upset, require frequent dressing, wear away, and require replacement; and radiation of the heat from the work requires more time for heating and more current than where such radiation is prevented. My concept is to employ two sets of electrodes and cross two separate and distinct electric currents in the work, each set of electrodes being of the same size at their contact ends as heretofore but each being required to carry only one-half as much current to make the same size of weld as heretofore, thus eliminating loss of energy and heating between the work and electrodes and reducing the wearing-down effects on the electrodes. Extending the concept still further, I may apply pressure directly at the heated area by steel dies or other suitable means independent of the copper electrodes, which permits larger areas and heavier material to be welded than under other methods known to me.

In the accompanying drawings, I disclose various instrumentalities for carrying out my improved method. For example, Figure 1 shows two sets of electrodes engaging two overlapped sheets of metal, and two electric transformers and welding circuits for the electrodes in diagram. Fig. 2 shows two sets of electrodes welding a thin plate to a heavy plate, the electrodes in contact with the heavier plate being spaced apart proportionately to the thickness thereof to bring about an intersection of the two lines of electric current at the meeting surfaces between the two plates. Fig. 3 shows two sets of rollers producing a linear weld according to my improved method, and Fig. 4 is a side view of Fig. 3. Figs. 5 and 6 are front and side views, respectively, of two sets of electrodes and intervening pressure devices engaging the plates opposite the desired spot or place of union in the meeting surfaces of the plates. Figs. 7 and 8 are section and side views respectively, of a bail ear united to the wall of a vessel or other article by a weld produced by the method herein described.

In practising my improved method, two or more pieces of metal P are placed in facial contact between two pairs of electrodes $a$, $a'$ and $b$, $b'$, which are connected to the secondary bands of two transformers A and B, respectively. Both transformers are electrically connected to the same source of supply and are used to pass two separate and distinct electric currents of high amperage and low voltage through both pieces P on crossed and intersecting lines, the electrodes of opposite polarity for each transformer being arranged diagonally opposite each other on opposite sides of the work. Thus, the electrodes $a$ and $a'$ are of opposite polarity and placed diagonally opposite each other on opposite sides of the work and connected to transformer A, while the electrodes $b$ and $b'$ are also of opposite polarity and diagonally related on opposite sides of the work and connected to transformer B. The electrodes of like polarity are collaterally related on opposite sides of the work but spaced apart from each other, and where the spacing is equal on both sides of the work the electrodes *a* and *b* are in direct alinement with the electrodes *b'* and *a'*, respectively. Insulation may be used between the electrodes as shown in Fig. 1, but where a wider space intervenes such insulation may be omitted, and where plates of different thicknesses are being welded together, the electrodes in contact with the thicker plate may be separated to a greater extent than the electrodes engaging the thinner plate, a relationship of parts shown in Fig. 2. Any suitable means or instrumentality known to those skilled in the art may be used to apply pressure to and through the electrodes, and roller electrodes may be used where a linear weld is to be produced. Such roller electrodes are shown in Figs. 3 and 4, and where the pressure is to be applied independently of the electrodes to upset the weld a separate set of dies or pressure members 5 and 6 may be used in the space between the electrodes, as shown in Figs. 5 and 6. Here it will be noted that the pressure devices are alined directly opposite the intersection of the paths of the two electric heating currents and that each pressing member is spaced apart or insulated from the electrodes. The dies or members 5 and 6 may be made of any suitable material and preferably harder material than the electrodes, and their sole function is to upset or compress the heated metal, either when the electric heating current is passing or subsequently, thus relieving the copper electrodes of this work.

To effect a satisfactory weld, it is customary to reduce or taper the contact ends of the copper electrodes, and said reduced ends will only carry a certain amount of electric current without over-heating. By employing two separate and distinct electric currents and two sets of electrodes and concentrating both currents at the meeting surfaces of the metal pieces by crossing the paths of the currents, an intensified heating effect is obtained at the desired place of union with the use of only one-half as much current from each transformer and the passage of only one-half as much current through the electrodes as heretofore where the same size of weld is being made, and furthermore, two sets of electrodes give twice as much contacting surface and better electrical connection than one set and in this way eliminate loss of energy and heat to a large extent.

Also, in practising my method, the electrodes are not seated directly over or opposite the area of greatest heating because the currents travel in diagonal or bias directions and cross each other's paths on a median line between the electrodes, causing and allowing the heat to spread and cover a larger area than otherwise, which results in a more efficient and stronger weld than under other methods known to me.

In this connection, I wish to disclaim the use of two transformers and two sets of electrodes, broadly speaking, as the use of these devices for welding purposes are disclosed in the French patent to J. A. Bouchayers, No. 330,200, of 1903. However, the method therein practised is limited to the passing of an electric current between electrodes of opposite polarity placed on the same side of the sheets and parallel with the sheets but not on diagonal crossing lines through the sheets. Obviously, the electric currents naturally take the shortest path and travel on the outer sides of the sheets in Bouchayer. The exposed surfaces become hottest and burn before the meeting surfaces reach a welding temperature, in thick metal especially, but not necessarily in thin sheets.

My method is especially applicable to the welding of large areas in heavy plates. Thus, I may pass several separate currents on intersecting lines and at the same time apply the requisite pressure by separate dies at the area of greatest heating. Where the plates are level and fit together nicely it is not necessary to have the dies pressing upon the work while the electric current is passing and heating the metal, but the pressure may be applied subsequently to complete the weld. Where the plates are heavy and bent and have an imperfect and uneven contact, the dies may be used to apply pressure to straighten the plates and obtain a perfect contact before passing the current crosswise through the plates, and then when the metal has reached a welding temperature apply additional pressure through the dies to complete the weld, all without subjecting the copper electrodes to pressure beyond the need of a good electrical contact. In other words, the electrodes are merely used to carry the current and not to sustain the heavy pressures required to force the plates together and complete the weld. In practice, the preferred way is to apply the pressure through the dies before disengaging the electrodes from the work, as otherwise the metal cools too quickly.

In welding with wheels or rollers, I have the same advantages as in welding with stationary electrodes, namely;—twice as much contacting surface on the work, half as much current passing through each electrode, and on heavy plates I may use an additional wheel or set of wheels between the current conducting wheels or rollers to apply the pressure.

The weld produced by the method herein described is not round, such as in a spot weld, but is elongated and as further compared therewith involves more than twice as much of the material of the contacting surfaces. It is very much stronger, as the material is homogeneously united on a short line extending from one juxtaposed electrode to the other instead of in a small circular area and the pressure of the electrodes and expansion of the metal is at each end of the weld rather than in the center, and because the radiation of the heat spreads uniformly from the center of each point of contact the extended weld is rounded at its opposite ends. The complete weld is about twice as long as it is wide. The ends are also more compressed than at the center, except as it may be modified by additional pressure applied by a central die. The external formation of a normal weld is as shown in Figs. 7 and 8, wherein two shallow identations are separated by a narrow rib or ridge extending transversely at right angles to the longitudinal median line of the weld itself. The dotted lines show the shape and area of the weld at the meeting faces of the two pieces of metal.

A practical form of apparatus for producing such welds according to my invention is shown in my co-pending application filed July 23, 1917, Serial No. 182,139.

What I claim is:

1. The method herein described of pressing pieces of metal together into good contact, passing separate electric heating currents on intersecting lines through the pieces while under such pressure, and applying additional pressure when the metal has reached a welding temperature.

2. The herein described method of heating pieces or sheets of metal to a welding temperature for the purpose of welding same, consisting in pressing the pieces or sheets together between electrodes and at the same time passing two separate heating or welding currents through each other's paths to intensify the heating effect at one point and continuing the flow of current until a union is effected.

3. The herein described method of fastening two pieces or sheets of metal together at a circumscribed place only in their meeting surfaces consisting in simultaneously pressing them together and passing two electric currents in bias directions through each other's paths and continuing said flow of currents until a union is effected.

4. The herein described method of uniting two pieces of metal at a spot or spots only in their opposed meeting surfaces, consisting in simultaneously pressing the pieces together between the electrodes and passing two welding currents therethrough in bias directions through each other's paths and continuing said flow of current until a spot or spots of union are effected which are entirely surrounded by areas of non-welded union.

5. The herein described method of fastening two pieces of metal together at a spot only in their meeting surfaces consisting in simultaneously pressing the pieces together between dies and passing a welding electric current in a bias direction through the line of pressure of said dies and continuing the flow of said current until a welding heat has been obtained and then applying additional pressure with said dies to effect or complete the weld.

6. The herein described method of uniting pieces or sheets of metal together at a place or places in their meeting surfaces consisting in pressing the pieces or sheets together and while under pressure passing two or more electric welding currents in a bias direction through each other's paths and concentrating the heating effect at one desired place or places and applying additional pressure with dies or the like over the heated portion to complete the weld.

7. An improved method of fastening two pieces or sheets of metal together at a circumscribed place only in their meeting surfaces, consisting in simultaneously pressing said pieces or sheets together and passing a plural number of electric currents of large volume in bias directions through the metal and each other's paths until a welded union is effected.

8. A method of electrically welding pieces or sheets of metal together at small circumscribed areas in their meeting surfaces, consisting in pressing the pieces or sheets together, and while under pressure producing an intensified heating effect in the meeting surfaces by passing separate electric currents in bias directions through the metal and through each other's paths with the lines of intersection approximately at the joint line, and then applying additional pressure to give the welded material a greater density than the metal immediately surrounding the weld.

9. A method of electric welding consisting in placing two pieces of metal in facial contact between two pairs of electrodes placed in juxtaposition with the electrodes of opposite polarity arranged diagonally opposite each other on opposite sides of the work; passing separate electric currents from the electrodes of opposite polarity through the work on intersecting lines; and applying pressure to the work opposite the place of intersection of the electric currents in the work.

10. An article of manufacture embodying overlapping pieces of metal having short linear welds uniting their contiguous surfaces together at intervals, the opposite ends of each weld being rounded and the plane surfaces opposite each weld having shallow concavities in juxtaposition with a narrow protuberance therebetween.

11. An article comprising metal pieces having their plane meeting faces welded together at intervals, each weld being approximately twice as long as it is wide and of greater density than the surrounding metal, and the surface opposite each weld having shallow indentations separated by a linear ridge extending transversely across the center of the weld.

12. A metal article comprising two or more pieces of metal united together in contacting relation by an elongated weld having the material thereof at its ends compressed to a greater degree than at the center thereof, the plane surfaces opposite the weld having juxtaposed indentations separated by a rib extending transversely to said elongated weld.

Signed at Cleveland, in the county of Cuyahoga and State of Ohio, this 8th day of March, 1917.

ALBERTIS C. TAYLOR.